US009479552B2

(12) United States Patent
Chen et al.

(10) Patent No.: US 9,479,552 B2
(45) Date of Patent: Oct. 25, 2016

(54) RECOMMENDER SYSTEM FOR CONTENT DELIVERY NETWORKS

(75) Inventors: Ming Chen, Bedford, MA (US); Xiwang Yang, Brooklyn, NY (US); Yong Liu, Brooklyn, NY (US); Lei Zhang, Frisco, TX (US)

(73) Assignee: VERIZON PATENT AND LICENSING, INC., Basking Ridge, NJ (US)

( * ) Notice: Subject to any disclaimer, the term of this patent is extended or adjusted under 35 U.S.C. 154(b) by 797 days.

(21) Appl. No.: 13/483,329

(22) Filed: May 30, 2012

(65) Prior Publication Data

US 2013/0325942 A1    Dec. 5, 2013

(51) Int. Cl.
*G06F 15/16* (2006.01)
*H04L 29/06* (2006.01)
*G06Q 10/10* (2012.01)
*H04L 29/08* (2006.01)
*G06F 12/00* (2006.01)

(52) U.S. Cl.
CPC .......... *H04L 65/4084* (2013.01); *G06Q 10/10* (2013.01); *H04L 67/22* (2013.01); *H04L 67/2852* (2013.01); *H04L 67/306* (2013.01)

(58) Field of Classification Search
CPC ....................................................... H04N 7/73

USPC .......................................... 709/204–205, 213
See application file for complete search history.

(56) References Cited

U.S. PATENT DOCUMENTS

| | | | |
|---|---|---|---|
| 6,853,982 B2* | 2/2005 | Smith et al. ................. | 705/26.7 |
| 8,561,116 B2* | 10/2013 | Hasek ............................ | 725/92 |
| 2006/0155779 A1* | 7/2006 | Kim et al. .................... | 707/201 |
| 2008/0306936 A1* | 12/2008 | Ho et al. ............................ | 707/5 |
| 2009/0234784 A1* | 9/2009 | Buriano et al. ................. | 706/12 |
| 2011/0099228 A1* | 4/2011 | Smith ........................... | 709/205 |
| 2011/0167115 A1* | 7/2011 | Gilbert et al. ................ | 709/204 |
| 2012/0072526 A1* | 3/2012 | Kling et al. .................. | 709/213 |
| 2012/0159558 A1* | 6/2012 | Whyte et al. .................. | 725/95 |

* cited by examiner

*Primary Examiner* — Zarni Maung (57) ABSTRACT

A device includes a processor. The processor is configured to determine a hit time for each of a plurality of content items based on at least one of users' history of access to the content items on content distribution clusters in a content distribution network, the users' past ratings of the content items, and social network information associated with the users. The hit time of a content item indicates a number of times that the content item is likely to be accessed by the users. The processor is further configured to compute caching priorities of the content items based on a caching policy of the device and the determined hit times, and initiate a redistribution, over a network, of the plurality of content items over the content distribution clusters of the content distribution network based on the caching priorities.

24 Claims, 7 Drawing Sheets

RECOMMENDER SYSTEM FOR CONTENT DELIVERY NETWORKS

BACKGROUND INFORMATION

In recent years, the demand for network bandwidth has been driving the demand for different types of network services and devices. Consequently, the global demand for Ethernet products is expected to increase at a compound annual growth rate (CAGR) of over 14.1% from year 2009 through 2015. The demand is projected to exceed $40 billion by 2015. The increasing demand for higher bandwidth networks partly stems from increasing network demand for content, such as movies, television programs, live broadcast, etc.

DETAILED DESCRIPTION OF PREFERRED EMBODIMENTS

The following detailed description refers to the accompanying drawings. The same reference numbers in different drawings may identify the same or similar elements. As used herein, the term "cache hit" or "hit" may refer to an event in which a piece of information (e.g., a piece of content or a content item) that is requested by a user device is found cached at a device(s) to which the request is made. Similarly, as used herein, the term "cache miss" may refer to an event in which a piece of information that is requested by a user device is not cached at a device(s) to which the request is made. When a cache miss occurs, the user device may be redirected to another device or a set of devices at which the information is stored. As used herein, the term "content" may include multimedia content, video content, audio content, web pages, programs, text, documents, images, pictures, etc.

As described herein, a device may prioritize a list of contents to be cached in each of content distribution clusters in a content distribution network (CDN). In prioritizing the list, the device may attempt to maximize the rate of cache hits at each of the clusters based on models of user behavior. By storing contents that maximize the rate of cache hits, each content distribution cluster may decrease delays that are associated with accessing particular contents, decrease reissuing requests for content, and reduce computational load on the CDN.

Figure 1:
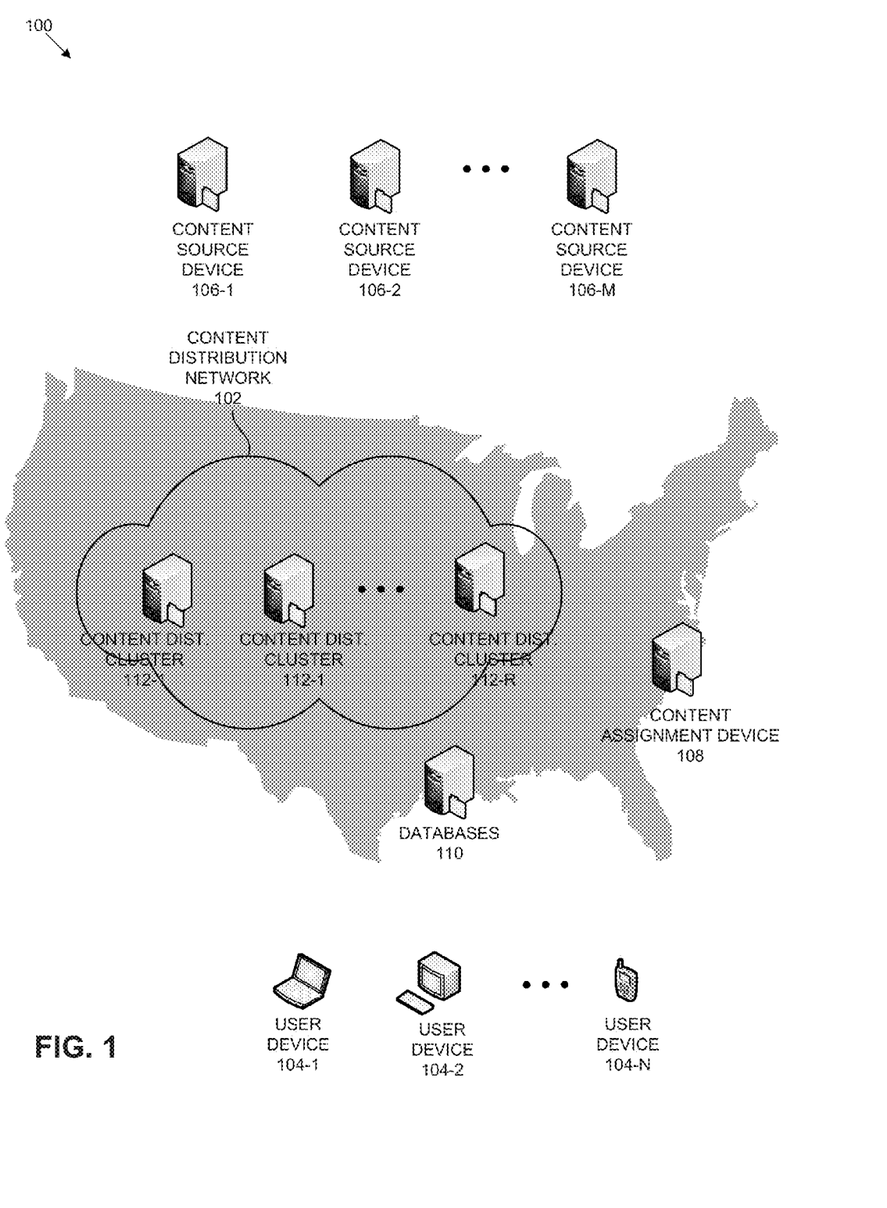
FIG. 1 illustrates an exemplary network in which concepts described herein may be implemented.

FIG. 1 illustrates exemplary network 100 in which concepts described herein may be implemented. Network 100 may include the Internet, an intranet, a local area network (LAN), a wide area network (WAN), a metropolitan area network (MAN), a cellular network, a public switched telephone network (PSTN), an optical network, an ad hoc network, any other network, or a combination of one or more networks.

As shown, network 100 may include content distribution network 102, user devices 104-1 through 104-N (collectively referred to as "user devices 104" and individually as "user device 104"), content source devices 106-1 through 106-M (collectively referred to as "content source devices 106" and individually as "content source device 106"), content assignment/recommender device 108, and databases 110.

Content distribution network 102 may include network server devices that store or cache copies of content/data items, placed at different geographic locations. Content distribution network 102 may efficiently deliver content to user devices 104. In content distribution network 102, each request for content may be handled by a device geographically close o the user device 104 making the request.

As further shown in FIG. 1, content distribution network 102 may include content distribution clusters 112-1 through 112-R (collectively referred to as "content distribution clusters 112" and individually as "content distribution cluster 112"). Content distribution clusters 112 are interconnected by a dedicated network. Each content distribution cluster 112 may be located at a specific geographical location and may serve user devices in particular geographical areas. Each content distribution cluster 112 may or may not include the same number of deployed server devices as another content distribution cluster 112. In one implementation, each of the devices/servers in content distribution clusters 112 have identical properties.

When a content distribution cluster 112 receives a request for content from a user device 104, the cluster 112 may determine whether the requested content is cached in the cluster 112. If the content is cached in the cluster 112, there is a cache hit. The cluster 112 may provide the content to user device 104. If the content is not cached at the cluster 112, the cluster 112 may redirect user device 112 to another cluster 112 that caches the content.

To optimize the quality of service provided by content distribution network 102, content/data items may be moved from one content distribution cluster 112 to another content distribution cluster 112. By moving content among devices in clusters 112 to bring a content item as close as possible to a requesting user device 104, content distribution network 102 operates faster than if content distribution network 112 were to redirect the request to another device (which holds the copy) further away. In some implementations, geographical distance may not be the only factor influencing delays in sending/distributing content.

Each device in content cluster 112, having a finite storage capacity, acts as a cache, and keeps copies of already requested content item for future requests. The devices within a cluster 112 coordinate to act as a single large cache. Depending on the implementation, clusters 112 may include different cache replacement strategies.

User device 104 may include a handset, cellular phone, smart phone, personal computer, laptop computer, tablet computer, set-top box, gaming console, personal digital assistant (PDA), and/or another type of communication and/or computational device that is capable of playing multimedia content. User device 104 may send a request for content to content distribution network 102 and receive content from content distribution network 102.

Content source device 106 may provide content to content distribution network 102. When new content becomes available, content source device 106 may send the new content to content distribution network 102. Content distribution network 102 may store the content at one of content distribution clusters 112. Content source device 106 may also provide, to content distribution network 102, updated content, as well as instructions to remove content (e.g., outdated content).

Content assignment device 108 may determine on which content distribution cluster 112 a particular content item is to be stored. That is, content assignment device 108 may assign or recommend each content item, from content source device 106, to a content distribution cluster 112, at which the content item will be stored/cached. In assigning the content item to a content distribution cluster 112, for each content distribution cluster 112, content assignment device 108 may provide a prioritized/ordered list of content items to be stored at the content distribution cluster 112. In obtaining the lists of contents for content distribution clusters 112, content assignment device 108 may consult databases 110 for information.

Databases 110 may include information on history of user behavior with regard to downloading content from content distribution clusters 112/content distribution network 102, information on one or more social networks, and/or information on contents (e.g., program times, metadata, etc.).

Figure 2:
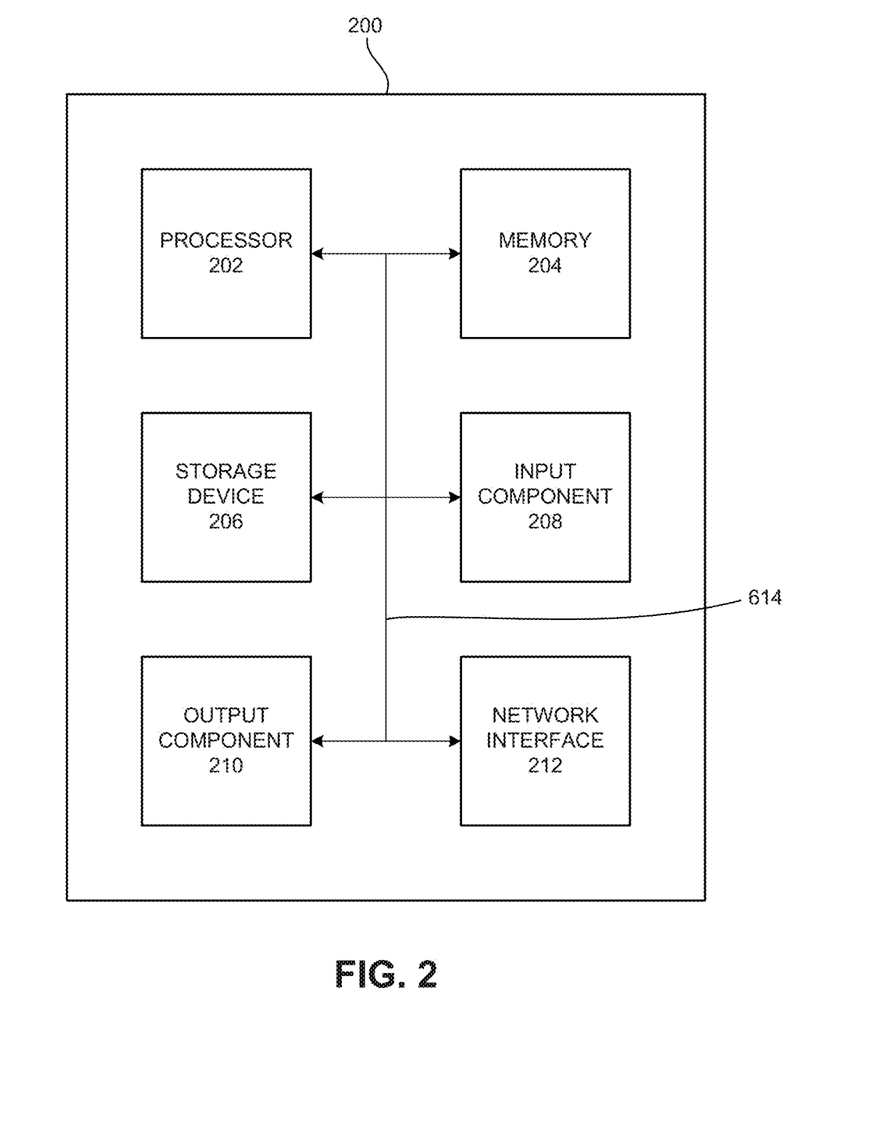
FIG. 2 illustrates exemplary components of one of the network devices of FIG. 1.

FIG. 2 is a block diagram of exemplary components of a network device 200. Network device may correspond to any of the devices illustrated in network 100, to one or more devices that form content distribution clusters 112, and/or to host devices for databases 110. As shown, network device 200 may include a processor 202, memory 204, storage unit 206, input component 208, output component 210, network interface 212, and communication path 214. In different implementations, device 200 may include additional, fewer, different, or different arrangement of components than the ones illustrated in FIG. 2. For example, device 200 may include line cards for connecting to external buses.

Processor 202 may include a processor, a microprocessor, an Application Specific Integrated Circuit (ASIC), a Field Programmable Gate Array (FPGA), and/or other processing logic (e.g., embedded devices) capable of controlling device 200, executing programs/instructions, etc.

Memory 204 may include static memory, such as read only memory (ROM), and/or dynamic memory, such as random access memory (RAM), or onboard cache, for storing data and machine-readable instructions (e.g., programs, scripts, etc.). Storage unit 206 may include a floppy disk, CD ROM, CD read/write (R/W) disc, holographic versatile disc (HVD), digital versatile disc (DVD), and/or flash memory, as well as other types of storage devices (e.g., hard disk drive) for storing data and/or machine-readable instructions (e.g., a program, script, etc.). Depending on the context, the term "memory," "storage," "storage device," and/or "storage unit" may be used interchangeably. For example, a "computer-readable storage device" or "computer-readable medium" may refer to both a memory and/or storage device.

Input component 208 and output component 210 may provide input and output from/to a user to/from device 200. Input/output components 208 and 210 may include a display screen, a keyboard, a mouse, a speaker, a microphone, a camera, a DVD reader, Universal Serial Bus (USB) lines, and/or other types of components for converting physical events or phenomena to and/or from signals that pertain to device 200.

Network interface 212 may include a transceiver (e.g., a transmitter and a receiver) for device 200 to communicate with other devices and/or systems. For example, via network interface 212, device 200 may communicate over a network, such as the Internet, an intranet, a terrestrial wireless network (e.g., a WLAN, WiFi, WiMax, etc.), a satellite-based network, optical network, etc. Network interface 212 may include a modem, an Ethernet interface to a LAN, and/or an interface/connection for connecting device 200 to other devices (e.g., a Bluetooth interface).

Communication path 214 may provide an interface through which components of device 200 can communicate with one another.

Network device 200 may perform the operations described herein in response to processor 202 executing software instructions stored in a non-transient computer-readable medium, such as memory 204 or storage device 206. The software instructions may be read into memory 204 from another computer-readable medium or from another device via network interface 212. The software instructions stored in memory 204 or storage device 206, when executed by processor 202, may cause processor 202 to perform processes that are described herein.

Figure 3:
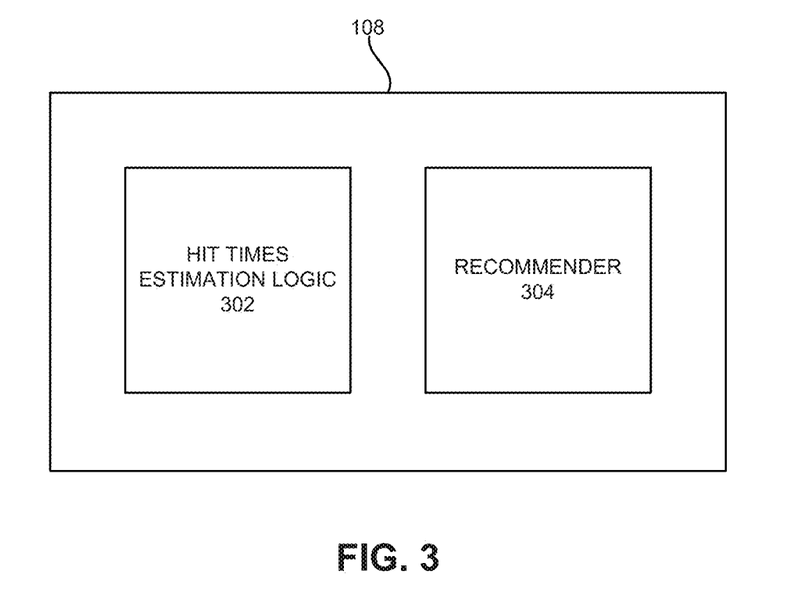
FIG. 3 illustrates exemplary functional components of a content assignment device of FIG. 1.

FIG. 3 illustrates exemplary functional components of content assignment device 108 an/or devices of content distribution cluster 112. As shown, content assignment device 108 (or a device in content distribution cluster 112) may include hit times estimation logic 302 and a recommender 304. Although content assignment device 108 (or a similar device in a content distribution cluster 112) includes other additional functional components, they are not illustrated in FIG. 3 for simplicity. For example, content assignment device 108 may include an operating system, a web server, device drivers, application servers, etc.

Hit times estimation logic 302 may determine, for each content distribution cluster 112, a prioritized list of contents. In determining such a list, hit times estimation logic 302 attempts to maximize the number of total hits over all content items in content distribution network 102. If the total number of hits is denoted by T, then:

$$T = \max \sum_{u \in U} \sum_{i \in S_u^{+,k}} z \qquad (1)$$

where u denotes a user, and U denotes the set of all users. i denotes the set of all content items in content distribution network 102. $S_u^{+,k}$ denotes the set of contents that user u likes and are cached in the geographically closest cluster/device. z is a constant summed over indices of the summation in expression (1) (e.g., z=1). Denote a content distribution cluster 112 as c. Also denote a set of users associated with the cluster as $U_c$ and clusters 112 as C. Expression (1) can then be rewritten as:

$$T = \max \sum_{c \in C} \sum_{u \in U_c} \sum_{i \in S_u^{+,k}} z \qquad (2)$$

To maximize the hit times under the constraints expressed by (1) or (2), hit times estimation logic 302 needs to predict contents that will be requested most/more times in each cluster 112. Hit times estimation logic 302 may access a database of users' rating history (history database) about contents that the users watched. A high rating value means a strong preference and a low rating value means a weak preference.

Denote $R_{u,i}$ as u's rating for i in history data. Hit times estimation logic 302 first predicts missing ratings (e.g., ratings for content items that a user has not rated). Denote the predicted rating matrix as $\hat{R} \in R^{u_o \times i_o}$ where $\hat{R}_{u,i}$ denotes the predicted rating of u to i. $i_o$ denotes the number of items, and $u_o$ denotes the number of users. $\hat{R}_{u,i}$ is modeled as:

$$\hat{R} = r_m + QP^T, \quad (3)$$

with matrices $P \in R^{i_o \times j_o}$ and $Q \in R^{i_o \times j_o}$, where $j_o \ll i_o$, $u_o$ is the rank; and $r_m \in R$ is a (global) offset. $P_i$ is item i's latent feature and $Q_u$ is user u's latent feature.

The predicted rating of u for item i, $\hat{R}_{u,i}$, is calculated as:

$$\hat{R}_{u,i} = r_m + Q_u P_i^T \quad (4)$$

Hit times estimation logic 302 minimizes the square error:

$$\Sigma_{all\ u} \Sigma_{all\ i} W_{u,i} (R_{u,i}^{o\&i} - \hat{R}_{u,i})^2 + \lambda(\|P\|_F^2 + \|Q\|_F^2) \quad (5)$$

Hit times estimation logic 302 is trained by summing not only over the observed ratings, but over all content items. $\lambda > 0$ is a regularization parameter. Hit times estimation logic 302 may use the Frobenius norm, denoted by $\|\cdot\|_F$, to regularize the learned matrices P and Q. The ratings predicted by the model are denoted by $\hat{R}_{u,i}$ (see (4)); and $R_{u,i}^{o\&i}$ equals the actual rating value in the training data if observed for user u and item i; otherwise the value $R_{u,i}^{o\&i} = r_m$ is imputed. In expression (5), the following training weights $W_{u,i}$ may be used:

$$W_{u,i} = \begin{cases} 1 & \text{if } R_{u,i}^{o\ \&\ i} \text{ observed} \\ w_m & \text{otherwise} \end{cases}$$

In this implementation, the weight assigned to the imputed ratings is positive. In contrast, the usual optimization of the root mean square error (RMSE) test-measure is obtained by training with $w_m=0$. This seemingly small difference has the important effect that hit times estimation logic 302 is trained on all items, while the popular RMSE-approaches are trained only on the observed ratings.

Hit times estimation logic 302 assumes that the probability $P_{u,i}$ that user u will requests a content item i only depend on user u's preference of item i, i.e., $\hat{R}_{u,i}$. Thus, $$P_{u,i} = P_{u,i}(\hat{R}_{u,i}) \quad (6)$$

With the above assumption, hit times estimation logic 302 may estimate content item i's hit times in the future in each cluster as:

$$h_i = \sum_{u \in U_c \setminus S_i} P_{u,i'} \quad (7)$$

where $S_i$ is the set of users who rated content item i. As users in $S_i$ already watched/viewed content item i before, they do not contribute to the hit in the future. $u \in U_c \setminus S_i$ are all the users associated with server cluster c, but have not yet rated content item i.

Assume that hit times estimation logic 302 is provided with a dataset for determining the hit times. If the dataset includes a user's click history, i.e., that dataset only contains information about which user watches which content item, hit times estimation logic 302 sets $R_{u,i}=1$ if user u watched content item i. Otherwise, hit times estimation logic 302 sets $R_{u,i}=0$. This means hit times estimation logic 302 gets a binary rating matrix R. Hit time estimation logic 302 may then estimate $h_i$ in accordance with expression (7).

If the dataset includes information about a user's watching time of each content item, hit times estimation logic 302 sets:

$$R_{u,i} = \frac{T_{u,i}}{T_i^f}, \quad (8)$$

where $T_{u,i}$ is the user u's watching time for content item i, and $T_i^f$ is the watching time for the full length of content item i. Hit time estimation logic 302 may determine the hit times in accordance with expression (7), with (6) and (8).

After hit times estimation logic 302 obtains the predicted rating for all content items, hit times estimation logic 302 may convert the predicted rating to probability of a user's request of a content item, as shown in expression (6).

In some implementations, hit estimation logic 302 may determine the hit times based on ratings as a function of social network information. In real life, people often resort to friends in their social networks for advices before purchasing a product or a service. Findings in sociology and psychology fields indicate that human beings tend to associate and bond with similar others. Due to the stable and long-lasting social bindings, people are more willing to share their personal opinions with their friends, and typically trust recommendations from their friends more than those from strangers and vendors. Typically, in a social network, people share posts, news, and videos (content items) with friends. Thus, for example, users influence each other in online social network via social links. This implies that user's online behavior in social network is positively correlated to the user's friend's behavior.

Hit times estimation logic 302 may determine the ratings as a function of social network in several ways. In these implementations, users are assumed to be connected in a social network $G=(V, E)$, where V is the set of users, E is the set of friendship links. Each user is assumed to share his past behavior, e.g., watching videos, with his direct friends.

In one implementation, more specifically, his times estimation logic 302 determines the hit times using a set of social network based nearest neighbor (NN) approaches to predict content playing times (e.g., video watching time) by considering both social trust and Collaborative Filtering (CF). As used herein, the term "CF-user latent feature (CF-ULF)" may refer to this particular approach.

In the CF-ULF, hit times estimation logic 302 bases its computations on expression (4). Denote by $k_1$ the number of nearest users identified by the CF approach, and by $k_2$ the number of trusted users identified by the social network based approach. Hit times estimation logic 302 uses Pearson correlation coefficient to cluster the users in the user latent feature space. The $k_1$ users nearest to the source user u are identified; these $k_1$ users are detected among all users in all clusters. The relevant content items of these nearest users are voted to form the set of recommended content items (e.g., videos). The voting values for the candidate content items are computed as follows:

$$\text{Vote1}_{u,i} = \sum_{v \in N_u} \sum_i sim(u, v) \delta_{i \in I_v} \quad (9)$$

where $\delta$ is the Kronecker delta. $I_v$ denotes the set of relevant content items of user v. $N_u$ is the set of $k_1$ nearest neighbors of user u (as determined by the Pearson correlation). A "relevant content item i of user u" is a highly rated content item for the user. Hit ratings estimation logic 302 sets a rating threshold $r_0$. If $R_{u,i} \geq r_0$, i is relevant to user u.

Hit estimation logic 302 then normalizes the voting values and treats it as the probability user u requests content item i as:

$$\text{Vote}_{u,i} = \text{Vote1}_{u,i}/\|N_u\| \tag{10}$$

where $\text{Vote}_{u,i}$ is the vote concerning content item i for user u. The $k_1$ nearest neighbors of user u are weighted according to their similarity sim(u, v) with user u, measured in terms of the Pearson correlation coefficient between user u and v (in user latent feature space). Hit times estimation logic 302 estimates content item i's hit times in the future as:

$$h_i = \sum_{u \in U_c \setminus S_i} \text{Vote}_{u,i'} \tag{11}$$

where $u \in U_c \setminus S_i$ are all the users associated with server cluster c, but have not yet rated content item i.

In another implementation, his times estimation logic 302 determines the hit times based on a "pure trust" based model/approach. In the pure-trust based model, hit times estimation logic 302 employs the breadth-first search (BFS) in the social network to find $k_2$ trusted users to the source user u. The voting scheme is similar to the scheme employed in CF-ULF.

$$\text{Vote1}_{u,i} = \sum_{v \in N_u^{(t)}} \sum_i w_t(u, v) \delta_{i \in I_v}, \tag{12}$$

where $N_u^{(t)}$ denotes the set of trusted users of u, and $w_t(u, v)$ denotes the voting weight from user v. The value of $w_t(u, V)$ is set to be $d_v$, the depth of user v in the BFS tree rooted at user u. Hit estimation logic 302 normalizes this voting value and treats it as the probability user u requests content item i as:

$$\text{Vote}_{u,i} = \text{Vote1}_{u,i}/\|N_u^{(t)}\| \tag{13}$$

A content item's hit time in a cluster is estimated by expression (11).

In yet another implementation, hit times estimation logic 302 employs yet another approach to determine the hit times of the content items, herein referred to as "trust-CF-ULF" model/approach. The trust-CF-ULF model is a combination of the CF-ULF model and the pure-trust model. In the trust-CF-ULF model, the value of $k_1$ is set to be equal to the value of $k_2$. In this model, hit times estimation logic 302 first finds $k_1$ closest neighbors from the CF neighborhood, then finds $k_2$ closest neighbors (from the trust neighborhood) which are not in the $k_1$ set. Hit times estimation logic 302 determines the votes of users in the combined neighborhood, with respect to their relevant content items.

w(u, v) is defined as the following:

$$\text{Vote1}_{u,i} = \sum_{v \in N_u^{(c)}} \sum_i w(u, v) \delta_{i \in I_v}, \tag{14}$$

where, $N_u^{(c)}$ is the combined neighborhood.

$$w(u, v) = \begin{cases} sim(u, v) & \text{if } v \in N_u \\ w_t(u, v) & \text{if } v \in N_u^{(t)}, \end{cases} \tag{15}$$

Hit times estimation logic 302 normalizes this voting value and treats it as the probability user u requests video i as:

$$\text{Vote}_{u,i} = \text{Vote1}_{u,i}/\|N_u^{(c)}\| \tag{13}$$

Hit times estimation logic 302 estimates content items' hit time in a cluster based on expression (11).

In yet another implementation, hit times estimation logic 302 employs yet another model, herein referred to as "trust-CF-ULF-best" model. The trust-CF-ULF-best model improves upon trust-CF-ULF by dynamically tuning the values of $k_1$ and $k_2$ so as to obtain the best recall results (e.g., maximum hit times).

For binary rating data, hit times estimation logic 302 estimates content item hit times in the same way as shown in equation (7). For user's watching time of each content item, hit times estimation logic 302 converts it to a rating following expression (8) and then estimates requested time as expression (7).

In the above implementations, hit times estimation logic 302's computations/determinations are based on a model with a number of assumptions. For example, it is assumed that if every device can host up to k content items and if there are N devices in a cluster 112, that cluster is equivalent to a single cache able to host kN different content items. It is also assumed that the size of the file of a content item does not vary much across different content items. This simplifies the definition of the model but still captures the heterogeneity of cluster sizes.

Recommender 304 may provide the results of hit times estimation logic 302 to other devices in network 100 (e.g., devices in content distribution clusters 114). In addition, recommender 304 may collect information that hit times estimation logic 302 needs to perform its computation/determination from other devices in network 100 and provide such information to hit times estimation logic 302.

Figure 4:
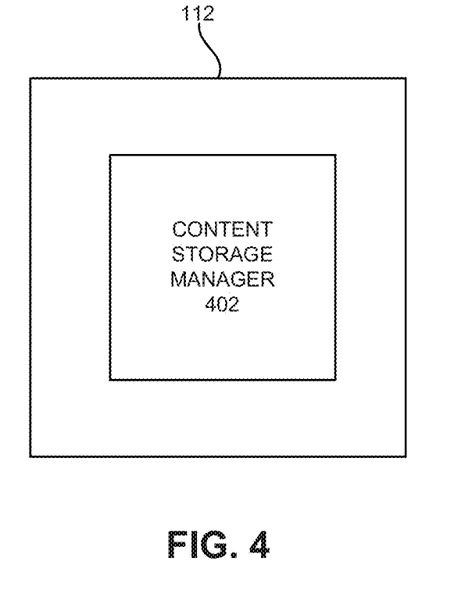
FIG. 4 illustrates an exemplary functional component of a content distribution cluster of FIG. 1.

FIG. 4 is a block diagram of a functional component of content distribution cluster 112. As shown, content distribution cluster 112 includes content storage manager 402. In implementations in which content distribution cluster 112 includes one or more server devices, each device may include content storage manager 402. Although content distribution cluster 112 or each device in content distribution cluster 112 includes other functional components, they are not illustrated in FIG. 4 for simplicity.

Content storage manager 402 may use a content replacement strategy to remove a content item from the cache (e.g., storage) when it is full and a new request for an uncached content item arrives. Each strategy assigns priorities to the content items in memory. When a deletion is needed because the cache is full, content storage manager 402 may remove, from its storage, a content item with the lowest priority. The priority of a content item may be updated whenever a request for that content item is issued from user device 104.

Content storage manager 402 may adopt standard caching replacement methods. Depending on the implementation, such methods may be augmented by results from recommender 304 in content assignment device 108. Each policy assigns a priority P (i) to a content item i and, when a content item has to be removed, content storage manager 402 may select a content item with the lowest priority for deletion.

Content storage manager 402 may make a random choice when more than one videos have the lowest priority.

Depending on the implementation, content storage manager 402 may adopt different caching policies: Least-Recently-Used (LRU), Least-Frequently-Used (LFU), Mixed, and Recommender-based. In the LRU, the priority of a content item i is given by P (i)=clock, where clock is an internal counter. clock is decremented by one whenever a new content item is requested, and its value is assigned to the newest requested content item while other content item's priority value remains the same. A content with a higher priority number has higher priority. This policy provides a simple aging effect. When a content item is not requested for a long time, it is eventually removed from the cache. However, the policy does not take into account the content item's popularity.

In the LFU, the priority of a content item i is given by P (i)=Freq(i), where Freq(v) is the number of times a content item has been requested since it was stored in the cache for the last time. The LFU favors popular content: if a content item receives a large number of requests it will stay in the cache for a long time. However, the LFU is less flexible. A content item which was largely popular in the past may tend to remain in the cache even if it is not requested anymore.

The Mixed policy combines both LRU and LFU features and the priority of a content item is given by P (i)=clock+Freq(i), in order to balance both temporal and popularity effects. Thus, a content item increases its priority when the content item is requested many times, but, if there are no more requests, the content item will eventually be removed from the cache.

In a different implementation, recommender 304 provides content storage manager 402 (on the same or a different device than recommender 304) with estimated hit times for content items. As discussed above, hit estimation logic 402 determines a hit-weight of each content item i, as shown in expressions (6) and (9). A hit-weight is set to be $h_i$, and, as discussed above, captures the estimated times a content item will be requested in the future. The estimated request probability $P_{u,i}$ is determined by the predicted rating $\hat{R}_{u,i}$ which employs the collaborative filtering (CF) technique. In the CF, it is assumed that if users have similar taste in the past then they will have similar taste in the future, and use a similar user's behavior (rating) to predict a target user's behavior(rating). Thus, CF methods capture the inter-connection, between users, that standard cache replacement methods ignore. The prediction model can be updated at each time tick in accordance with expression (4), and be used to calculate the expected hit number of content items in the future.

With recommender having provided $h_i$, for every user request, content storage manager 402 obtains a weight $h_i$ for content item and add it to the priority of the underlying cache replacement policy.

$$P_N(i) = P(i)\alpha h_i, \quad (17)$$

where $\alpha > 0$ is a tunable parameter, and P(i) is the priority as discussed as above for LRU, LFU, or Mixed.

Figure 5:
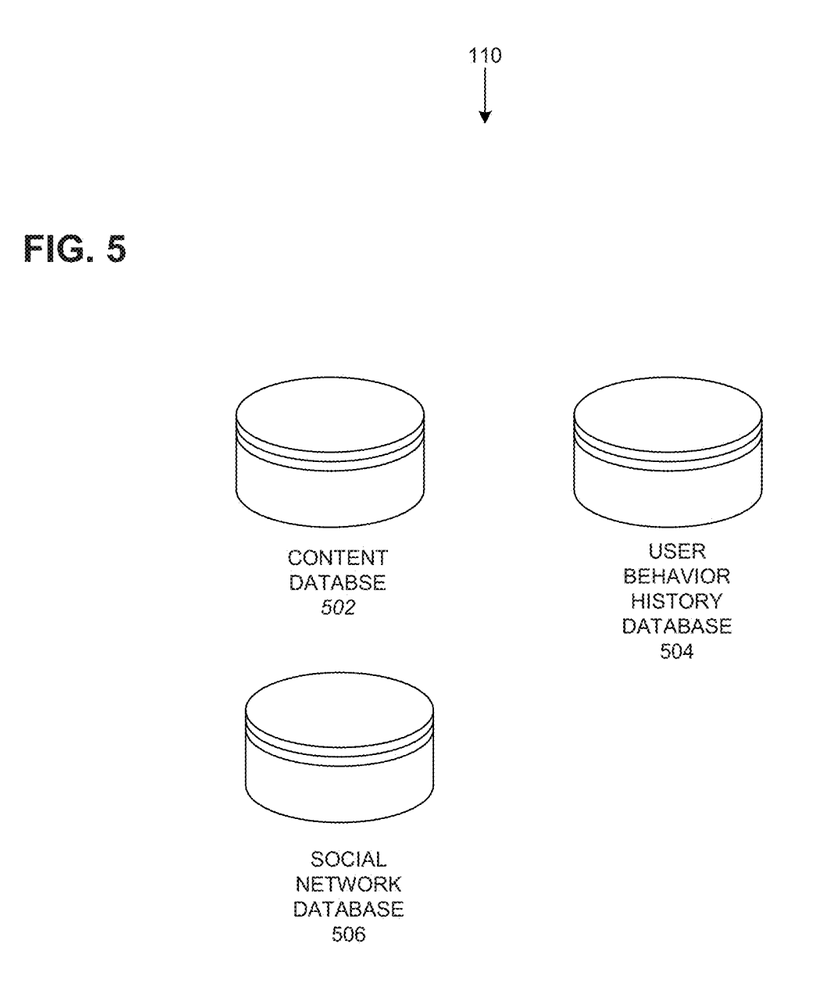
FIG. 5 illustrates the databases of FIG. 1.

FIG. 5 illustrates databases 110. As shown, databases 110 may include a content database 502, a user behavior history database 504, and a social network database 506. Content database 502, user behavior history database 504, and social network database 506 may provide information to another device in network 100, such as content assignment device 108 or a device in content distribution cluster 112. Depending on the implementation, databases 110 may include additional, fewer, or different databases than those illustrated in FIG. 5.

Content database 502 includes information about content (e.g., web pages, videos, audios, etc.). In some implementations, content database 502 may include metadata or other data, such as content program data (e.g., television program guide).

User behavior history database 504 may include information about user's past ratings, download selections, and other information (e.g., location, demographics, etc.).

Social network database 506 may include information about users and their social networks. In addition, social network database 506 may provide statistics about the social networks and/or information from which such statistics can be determined/calculated (e.g., an average number of friends/social links per person in a social network).

Figure 6:
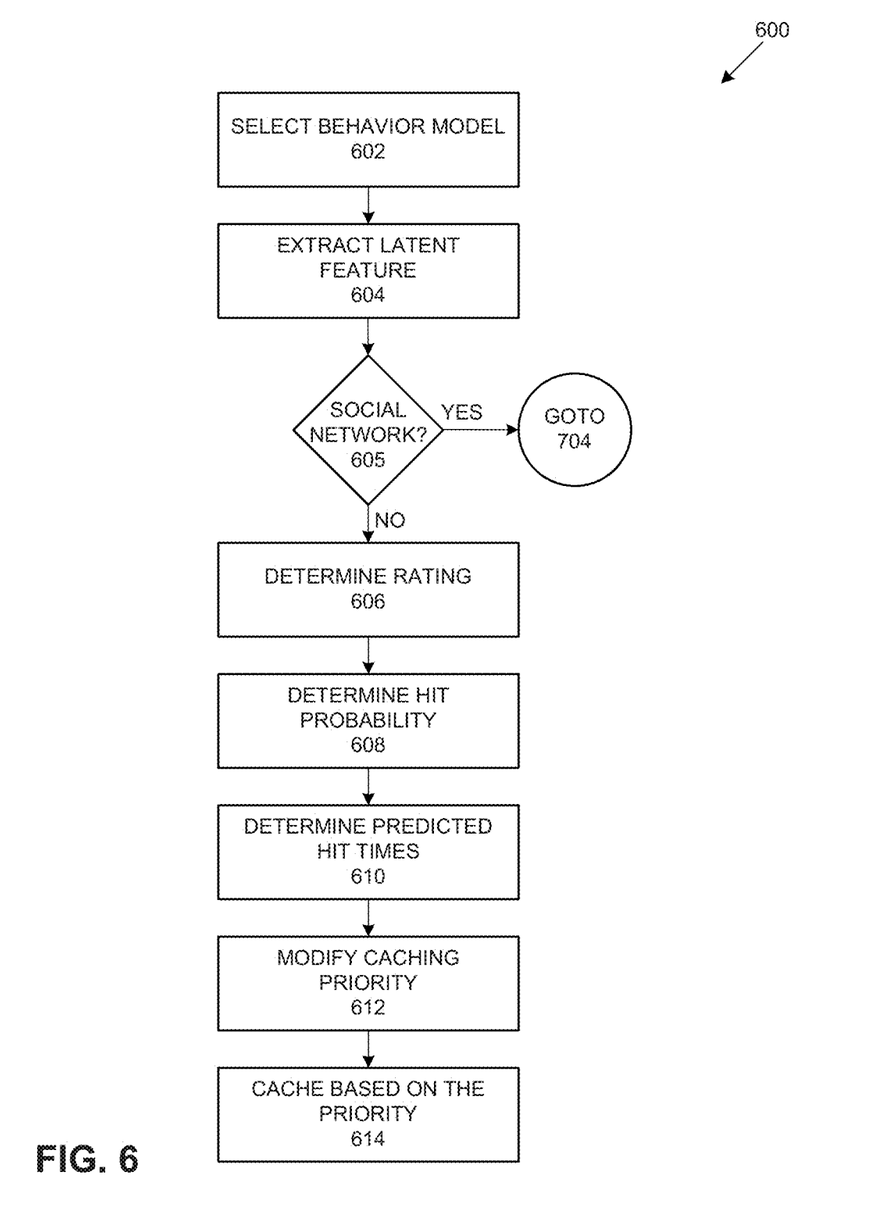
FIG. 6 is a flow diagram of an exemplary process that is associated with determining hit priorities without using social network information.

FIG. 6 is a flow diagram of an exemplary process 600 that is associated with determining hit priorities, without using social network information. Process 600 may be performed by a network device in network 100, such as content assignment device 108 and/or devices of content distribution clusters 112.

As shown, process 600 may include selecting a behavior model. In one implementation, the network device may receive user input via a client user interface (e.g., remote or local web interface). Via the user interface, the user may select a user behavior model. In other implementations, the selection may be performed via scanning information stored in a configuration file. Possible user behavior models include a no-social-network model, CF-ULF, pure trust, trust-CF-ULF, and trust-CF-ULF-best approach models, as described above.

The network device may extract latent features (block 604). As described above, a user's latent feature and a content item's latent features may be extracted in accordance with expression (5), which depends on observed ratings and training weights. The network device may obtain the ratings from information in content database 502 and user behavior history database 504.

Figure 7:
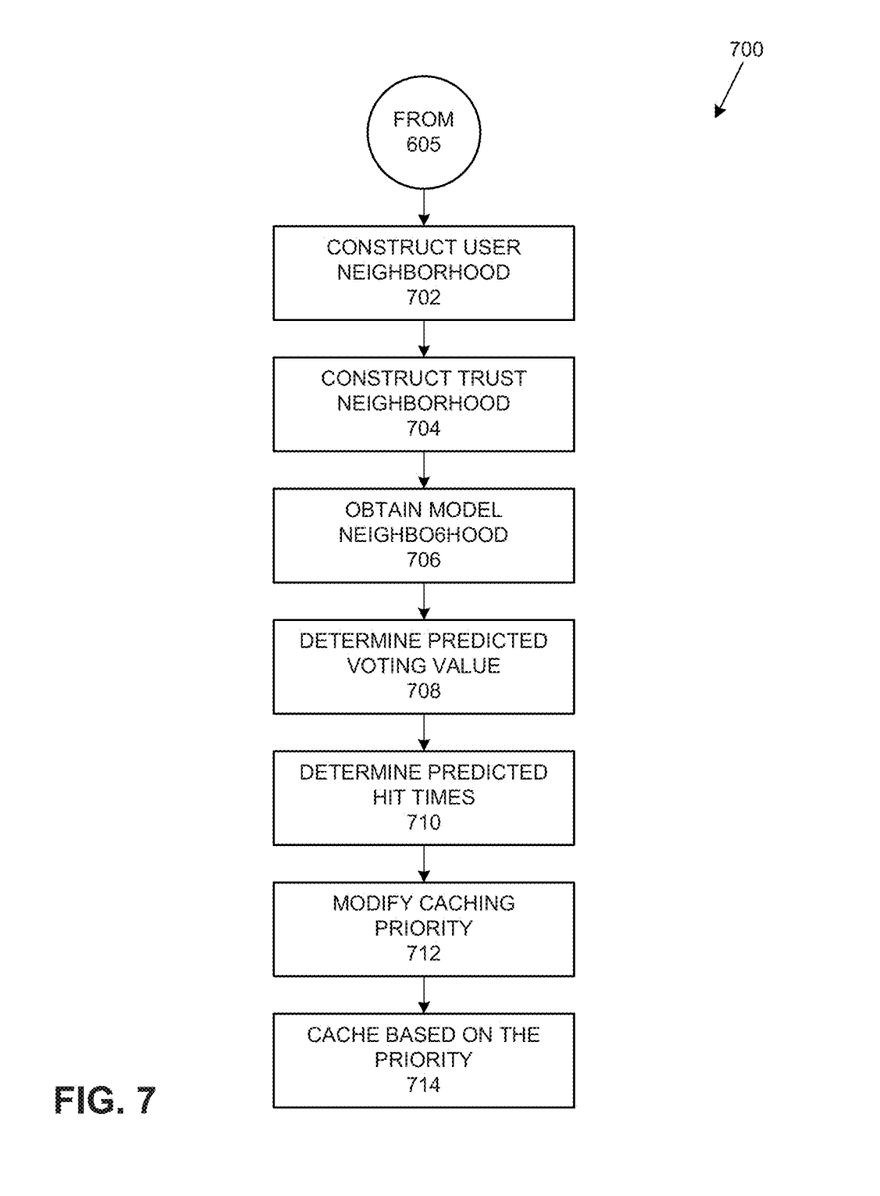
FIG. 7 is a flow diagram of an exemplary process that is associated with determining the hit priorities based on social network information.

The network device may determine whether the behavior model selected at block 502 involves social network information (block 605). If the behavior model involves social network information, process 600 may proceed to process 700 (block 605: yes). Otherwise, process 600 may proceed to block 606 (block 605: no). Using the extracted latent features, the network device determine ratings for each content item (block 606). The ratings may be determined based on expression (4).

The network device may determine a user's hit probability (block 608). The network device may determine the user's hit probability in accordance with expression (6). In evaluating (6), the network device may determine $\hat{R}_{u,i}$ in a number of ways. As described above, the $\hat{R}_{u,i}$ may be computed based on user's click history or based on user's viewing time of each content item (expression (8)).

Once the hit probabilities are computed, the network device may use the hit probabilities to determine predicted hit times (block 610) in accordance with expression (7). Once the hit times are determined, the network device may determine the caching priorities for each content item (block 612). As described above, determining the priorities depends on the caching scheme, LRU, LFU, or Mixed. For example, if the caching scheme is Mixed, the network device may determine the caching priorities of the content items based on expression (17).

After the priorities are determined (by either content assignment device 108 or by a device in a content distribution cluster 112), devices in content distribution clusters 112 may cache content items based on the priorities. If the network device is not the device that performs the caching, the network device may inform the caching device of the determined priorities.

FIG. 7 is a flow diagram of an exemplary process 700 that is associated with determining hit priorities based on social network information. Process 700 may be entered from process 600 when the network device referred to in process 600 determines that the behavior model selected at block 602 involves social network information (block 605: yes).

As shown, process 700 may include, for each user, constructing a user neighborhood based on user's latent features (block 702). As described above in reference to CF-ULF model, the network device may determine a user's latent features in accordance with expression (4).

The network device may construct a trust neighborhood (block 704). To construct the trust neighborhood, the network device may consult social network database 506. That is, for each user, the network may determine the social network by obtaining, for each user, a set of interconnected users via social links.

The network device may obtain a model neighborhood (block 706), depending on the behavior model selected at block 602. For example, if the CF-ULF model is selected at block 602, the network device may set the user neighborhood constructed at block 702 as the model neighborhood. If the pure-trust model is selected, the network device may set the trust neighborhood constructed at block 704 as the model neighborhood. If the trust-CF-ULF or trust-CF-ULF-best is selected, the network device may merge the user neighborhood and the trust neighborhood to obtain the model neighborhood.

The network device may determine predicted voting values (block 708) for the model neighborhood. The network device may determine the predicted voting value, based on expression (10), (13), or (16), depending on the behavior model selected at block 602.

The network device may determine predicted hit times (block 710) in accordance with expression (11). Thereafter, the network device may modify caching priorities in accordance with expression (17). As described above with block 612, determining the priorities depends on the caching scheme, LRU, LFU, or Mixed. After the priorities are determined, devices in content distribution clusters 112 cache content items based on the priorities.

As described above, a network device may prioritize a list of contents to be cached in each of content distribution clusters 112 in a content distribution network 102. In prioritizing the list of contents, the network device may attempt to maximize the rate of cache hits at each of the clusters 112 based on models of user behavior. By storing contents that maximize the rate of cache hits, each content distribution cluster 112 may decrease delays that are associated with accessing content items and decrease reissuing requests for content and reduce computational load on content distribution network 102.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the process illustrated in FIGS. 6 and 7, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, block, or instruction used in the present application should be construed as critical or essential to the implementations described herein unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. A method comprising:
caching each of a plurality of content items in one of a plurality of content distribution clusters;
obtaining a user access history of the content items based on recorded information about users' past access to the content items and the users' past ratings of the content items;
determining a hit time for each of the content items based on at least one of the user access history, the users' past ratings, and social network information associated with the users, wherein the hit time of a content item indicates a number of times that the content item is likely to be accessed by user devices associated with the users;
obtaining caching priorities of the content items based on a caching policy at the content distribution clusters and the determined hit times; and
transferring one or more of the content items from a first subset of the content distribution clusters to a second subset of the content distribution clusters based on the caching priorities,
wherein each of the content distribution clusters includes one or more physical devices configured to send one or more of the content items, to one or more of the user devices, without passing the one or more of the content items through any of others of the content distribution clusters.

2. The method of claim 1, further comprising:
selecting a user behavior model to determine the hit time for each of the content items based on at least the social network information associated with the users.

3. The method of claim 1, wherein the caching policy is one of:
a least frequently used (LFU) policy, a least recently used (LRU) policy, or a mix of the LFU policy and the LRU policy.

4. The method of claim 3, wherein obtaining the caching priorities includes evaluating, for each of the content items, a function of a time since a last access of the content item, a frequency of accessing the content item, and one of the hit times; and adding, for each of the content items, the results of evaluating to obtain one of the caching priorities.

5. The method of claim 1, wherein the user access history includes information regarding one of:

which of the users accessed which of the content items; or how much time each of the users spent on each of the content items.

6. The method of claim 5, wherein obtaining the caching priorities includes:

predicting the users' ratings of the content items based on the user access history and the users' past ratings;

determining, based on the users' predicted ratings, a probability of a request for each of the content items by each of the users; and predicting, for each of the content items, one of the hit times based on the probabilities.

7. The method of claim 6, wherein determining the hit time comprises:

adding the probabilities of a request for the user.

8. The method of claim 6, wherein predicting the users' ratings includes:

extracting first latent features associated with the content items and second latent features associated with the users based on the user access history and the users' past ratings; and calculating the users' predicted ratings using the first latent features and the second latent features.

9. The method of claim 8, wherein extracting the first latent features associated with the content items and the second latent features associated with the users includes:

selecting values, as the first latent features and second latent features, that minimize a root mean square error between the predicted ratings and the users' past ratings.

10. The method of claim 6, wherein, when the user access history includes how much time each of the users spent on each of the content items, each of the users' past ratings for one of the content items is a ratio of a time the user spent on accessing the one of the content items to a total duration of the one of the content items.

11. The method of claim 1, wherein determining a hit time for each of the content items includes:

constructing a model neighborhood for a user;

obtaining a predicted voting value for the content item for each of the users based on the model neighborhood; and determining the hit time for the content item based on the predicted voting values for the users, wherein the model neighborhood is a subset of the users, and wherein the predicted voting value is a probability that the user will select the content item given the model neighborhood.

12. The method of claim 11, wherein constructing the model neighborhood includes:

extracting first latent features associated with the content items and second latent features associated with the users based on the user access history and the users' past ratings; and identifying first users, among the users, closest to the user in a space of the second latent features, and including the identified first users in the model neighborhood.

13. The method of claim 12, wherein identifying the first users includes:

identifying the first users closest to the user in the space of the second latent features based on Pearson correlation.

14. The method of claim 11, wherein constructing the model neighborhood further includes:

identifying first users, among the users, closest to the user based on social network information for the user; and including the identified first users in the model neighborhood.

15. The method of claim 11, wherein constructing the model neighborhood further includes:

extracting first latent features associated with the content items and second latent features associated with the users based on the user access history and the users' past ratings;

identifying first users, among the users, closest to the user in a space of the second latent features;

identifying second users, among the users, closest to the user based on social network information for the user; and including the first users and the second users in the model neighborhood.

16. The method of claim 15, wherein the first users and the second users are tuned to obtain maximum hit times.

17. A device comprising, one or more processors to:

determine a hit time for each of a plurality of content items based on at least one of users' history of access to the content items on content distribution clusters in a content distribution network, the users' past ratings of the content items, and social network information associated with the users, wherein the hit time of a content item indicates a number of times that the content item is likely to be accessed by user devices associated with the users;

compute caching priorities of the content items based on a caching policy of the device and the determined hit times; and initiate a redistribution, over a network, of the plurality of content items over the content distribution clusters of the content distribution network based on the caching priorities, wherein each of the content distribution clusters includes one or more physical devices configured to send one or more of the content items, to one or more of the user devices, without passing the one or more of the content items through any of others of the content distribution clusters.

18. The device of claim 17, wherein when the one or more processors initiate the redistribution, the one or more processors are further configured to:

send a content item to a remote device in one of the content distribution clusters;

receive a content item from a remote device in one of the content distribution clusters;

send the computed caching priorities, to another device, for redistributing the plurality of content items over the content distribution clusters; or send remote commands to one or more devices in the content distribution clusters to transfer a content item in one content distribution cluster to another content distribution cluster among the content distribution clusters.

19. The device of claim 17, wherein when the one or more processors compute the caching priorities, the one or more processors are further configured to:
- extract first latent features associated with the content items and second latent features associated with the users based on the users' history of access and the users' past ratings;
- obtain the users' predicted ratings using the first latent features and the second latent features;
- determine, based on the predicted ratings, a probability of a request for each of the content items by each of the users; and
- predict, for each of the content items, one of the hit times based on the probabilities.

20. The device of claim 17, wherein the one or more processors are configured to:
- construct a model neighborhood for a user among the users;
- obtain a predicted voting value for the content item for each of the users based on the model neighborhood; and
- determine the hit time for the content item based on the predicted voting values for the users,
wherein the model neighborhood is a subset of the users, and
wherein the predicted voting value is a probability that the user will select the content item given the model neighborhood.

21. The device of claim 20, wherein when the one or more processors construct the model neighborhood, the one or more processors are configured to:
- extract first latent features associated with the content items and second latent features associated with the users based on the user's history of access and the users' past ratings; and
- identify first users, among the users, closest to the user in a space of the second latent features, and
- include the identified first users in the model neighborhood.

22. The device of claim 20, wherein when the one or more processors construct the model neighborhood, the one or more processors are configured to:
- identify first users, among the users, closest to the user based on social network information for the user; and
- include the identified first users in the model neighborhood.

23. The device of claim 20, wherein when the one or more processors construct the model neighborhood, the one or more processors are configured to:
- extract first latent features associated with the content items and second latent features associated with the users based on the user's history of access and the users' past ratings;
- identify first users, among the users, closest to the user in a space of the second latent features;
- identify second users, among the users, closest to the user based on the social network information for the user; and
- include the first users and the second users in the model neighborhood.

24. A non-transitory computer readable medium comprising computer-executable instructions for one or more processors, wherein when the one or more processors execute the instructions, the instructions cause the one or more processors to:
- cache each of a plurality of content items in one of a plurality of content distribution clusters;
- obtain a user access history of the content items based on recorded information about users' past access to the content items and the users' past ratings of the content items;
- determine a hit time for each of the content items based on at least one of the user access history, the users' past ratings, and social network information associated with the users, wherein the hit time of a content item indicates a number of times that the content item is likely to be accessed by user devices associated with the users;
- obtain caching priorities of the content items based on a caching policy at the content distribution clusters and the determined hit times; and
- transfer one or more of the content items from a first subset of the content distribution clusters to a second subset of the content distribution clusters based on the caching priorities,
wherein each of the content distribution clusters includes one or more physical devices configured to send one or more of the content items to one or more of the user devices, without passing the one or more of the content items through any of others of the content distribution clusters.

* * * * *